United States Patent
Finnie et al.

(10) Patent No.: US 6,920,216 B2
(45) Date of Patent: Jul. 19, 2005

(54) AUTOMATIC CALL DISTRIBUTION WITH COMPUTER TELEPHONY INTERFACE ENABLEMENT

(75) Inventors: Donald Finnie, Reading (GB); Carl R. Strathmeyer, Reading, MA (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 10/223,283

(22) Filed: Aug. 19, 2002

(65) Prior Publication Data

US 2004/0032944 A1 Feb. 19, 2004

(51) Int. Cl.⁷ .............................................. H04M 3/00
(52) U.S. Cl. ........................... 379/265.02; 379/265.01; 379/265.09
(58) Field of Search ........................ 379/265.01–265.14, 379/266.01–266.1, 258, 231, 201.01, 201.03, 93.09

(56) References Cited

U.S. PATENT DOCUMENTS

| 2001/0028649 A1 | 10/2001 | Pogossiants et al. | |
| 2003/0108064 A1 * | 6/2003 | Bilke et al. | 370/466 |

FOREIGN PATENT DOCUMENTS

EP    1318654 A    6/2003

OTHER PUBLICATIONS

Mattern F et al: "CTI–Ansteuerung einer TK–Anlage euber CORBA und Java Telephony API am Beispiel eines Least–Const–Routers"; Projektabschlussbericht Universitaet Darmstadt, pp. 1–69, XP002257652.

Alan Percy: "Advantages of S.100 For Developers"; Brooktrout Technology Online, Mar. 2000, XP002266604, Retrieved from the Internet: http://www.brooktrout.com/whitepapers/pdf/s100.pdf.

* cited by examiner

Primary Examiner—William J. Deane, Jr.
(74) Attorney, Agent, or Firm—Blakely, Sokoloff, Taylor & Zafman LLP

(57) ABSTRACT

A software ACD is described that is interposed between a switch or packet telephony environment, and an applications computer running a call processing application. The ACD may pass through primitive commands from the applications computer for direct execution by the switch or packet telephony environment, or in response to complex commands from the applications computer it may generate one or more different commands for execution by the switch or telephony environment.

20 Claims, 3 Drawing Sheets

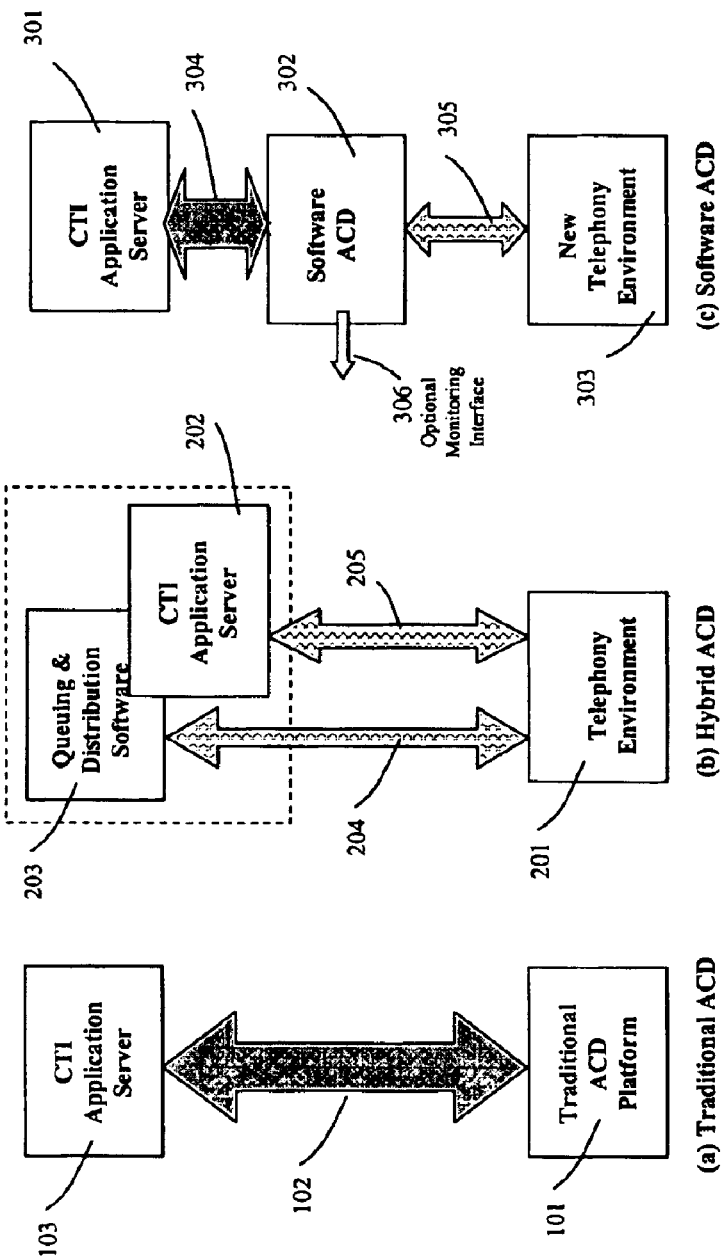

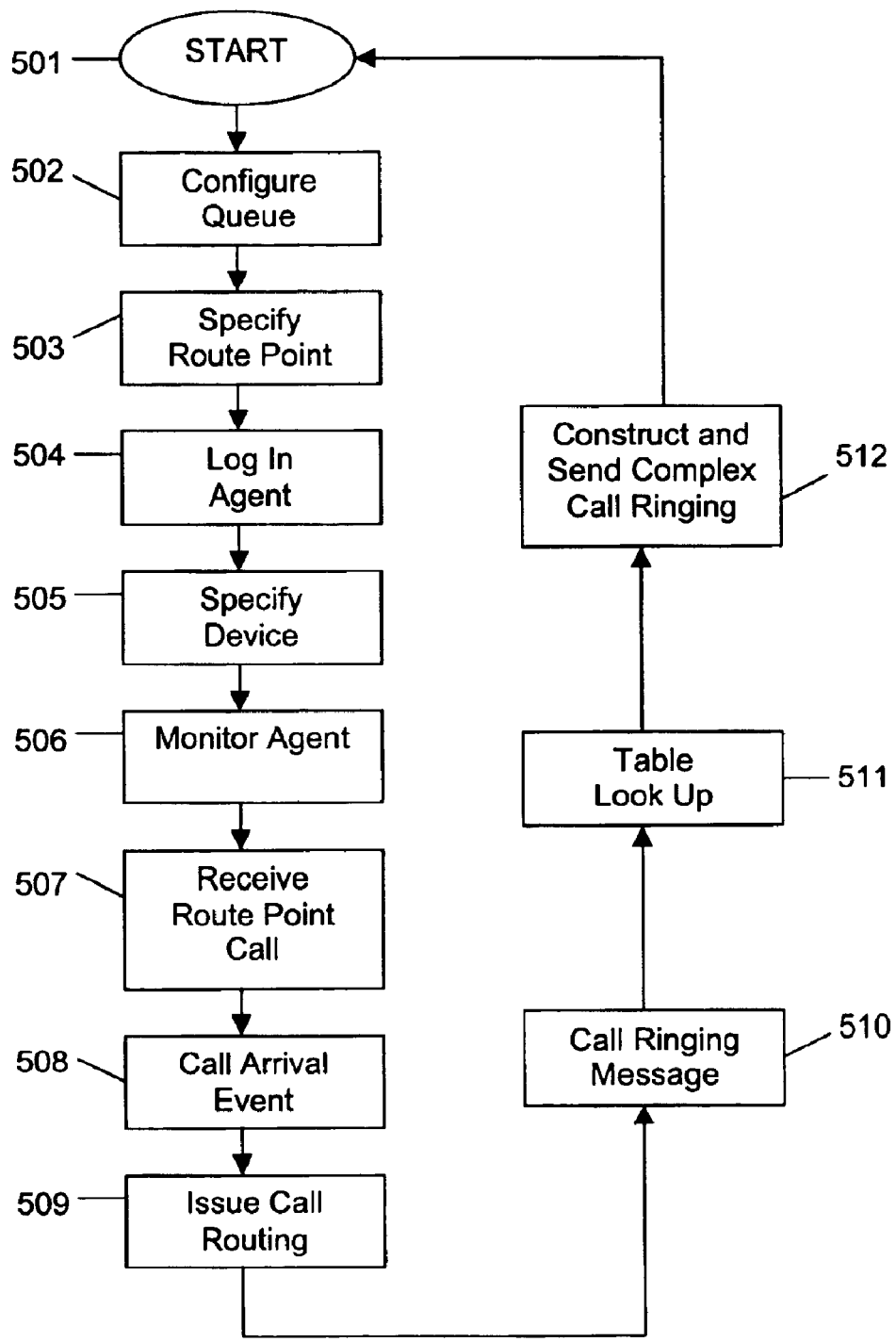

AUTOMATIC CALL DISTRIBUTION WITH COMPUTER TELEPHONY INTERFACE ENABLEMENT

TECHNICAL FIELD

This invention relates to computer telephony integration (CTI), and more specifically, to an improved automatic call distributor (ACD) capable of utilizing a switch with little or no intelligence to implement ACD capabilities by cascading a CTI application in series with a software ACD.

BACKGROUND OF THE INVENTION

ACD capabilities have recently become a standard part of most call center environments. ACD involves receiving relatively large numbers of calls and distributing them according to various algorithms to agents and/or automatic equipment for service and processing.

In more recent systems, it is known to optimize the call distribution function by matching particular calls with particular agents. For example, calls to a credit card servicing company might be classified, based upon calling telephone number, into one of several groups which indicate whether the caller is a "gold" member or a "platinum" member. Depending upon the group into which the incoming call is classified, the call would then be placed into one of several different queues, whereby callers with the highest level of membership will be serviced faster.

Many other examples exist in present ACD technology for optimizing the caller's experience. For example, callers may be matched to specialized servicing agents that speak particular languages, are familiar with particular issues, etc. Most systems also provide that the incoming caller's identification can be ascertained either from the calling number identification or other user input such as an account number. Such a step permits the system to retrieve a database record with detailed information regarding the customer's account, and display such database record to an agent prior to connecting the caller with the agent.

The foregoing and other ACD capabilities require somewhat significant intelligence to be built into the switching arrangement at the customer premises. FIG. 1 shows a very high level conceptual diagram of a prior art system for implementing an exemplary embodiment of the foregoing system. Server 101 represents a traditional ACD platform including queuing capabilities, call forwarding and call routing, directory information to permit call forwarding by name, and other similar items.

Communications link 102 is a full-function CTI link which connects a business application server represented by 103 to the traditional ACD platform 101. Such a CTI link may operate with the ECMA standard protocol, for example. Application server 103 would usually contain software to execute a standard business call center function, such as order entry. The application server 103 may also contain a database of customer information for use by agents when calls are distributed.

In the arrangement of FIG. 1, application server 103 may invoke and control the robust set of features present in ACD platform 101. However, ACD platform 101 is typically a proprietary and relatively expensive system with little flexibility. Applications developers writing software to serve as an application 103 must presume that a full set of ACD capabilities is available at the ACD platform 101. Accordingly, if a business only has a basic switching environment without a full set of ACD capabilities, the arrangement of FIG. 1 will not work because the primitive functions resident in a conventional switching environment without ACD capabilities are insufficient to meet the needs of a typical application 103.

FIG. 2 depicts a more advanced prior art system for implementing ACD capabilities. In FIG. 2, the telephony environment is shown as block 201 and, unlike the prior arrangement of FIG. 1, it does not contain ACD capabilities. Instead, telephony environment 201 may be a basic switching system such as a PBX. In newer environments, the telephone environment may instead consist of a packet telephony network, and may thus include a H.323 gatekeeper, or a proxy or pass-through server in a session initiation protocol (SIP) environment. Techniques of interfacing applications computers into both of these packet telephony environments are described in U.S. Pat. No. 6,201,805 and co-pending application Ser. No. 10/092,832, owned by the Assignee of the present invention.

In the arrangement of FIG. 2, the telephony environment 201 includes only primitive switching functions such as connecting calls between particular devices or ports based on an input telephone number. The telephony environment 201 would normally contain no "intelligence" and thus, is not capable of routing calls based upon user name, queuing calls, matching calls with customer database records, etc. These functions, typically part of any ACD system, must therefore be separately implemented in software that controls the primitive functions of the telephony environment 201.

In furtherance of the above, queuing and distribution software 203 issues appropriate primitive call control commands over link 204 into the telephony environment in order to cause the telephony environment 201 to execute the primitive switching functions required to accomplish the functionality of an ACD system. The CTI application server 202 runs a separate business application (e.g. order entry), which is most often written independently of queuing and distribution software 203. If the CTI application server 202 provides CTI call control functions, it is usually arranged to provide only the primitive CTI functions available from the telephony environment 201 and not the complete set of ACD functions implemented in queuing and distribution software 203.

The system in FIG. 2 permits a non-intelligent switch (e.g., 201) to be utilized as an ACD system by writing additional software 203. However, the customer's business application 202 does not have a global view of the combined system including functions implemented in software 203, and cannot take advantage of the ACD capabilities in queuing and distribution software 203. Additionally, the business application 202 can only issue primitive switching commands to the switch 201 because switch 201 can only understand and implement a very primitive set of functions such as connecting and disconnecting calls, sending call completion events, etc. No identity- or skills-based call routing, queuing, etc. is available. This makes the application development and the design of call flows more difficult and cumbersome.

The prior art therefore typically trades-off between two competing requirements. The arrangement of FIG. 1 permits the business application 103 to use a full and robust set of call control commands and have full control over the way calls flow through the ACD system. However, an intelligent, complex, and often proprietary ACD platform 101 is required. On the other hand, the arrangement of FIG. 2 permits ACD capabilities to be implemented as a supplement to a non-intelligent switch or other telephony environment interface. However, the business application and the ACD software are often independent and the business application therefore does not have full control of the combined system and is unable to make use of a full and robust set of call control functions.

BRIEF DESCRIPTION OF THE DRAWINGS

FIG. 1 shows a first exemplary prior art arrangement for implementing automatic call distribution (ACD) capabilities;

FIG. 2 depicts an additional prior art arrangement for implementing ACD capabilities;

FIG. 3 is a conceptual block diagram of an exemplary embodiment of the present invention;

FIG. 5 depicts a flow chart of a complex command being issued by the application and processed by an ACD and a switch.

DETAILED DESCRIPTION OF THE INVENTION

Figure 4:
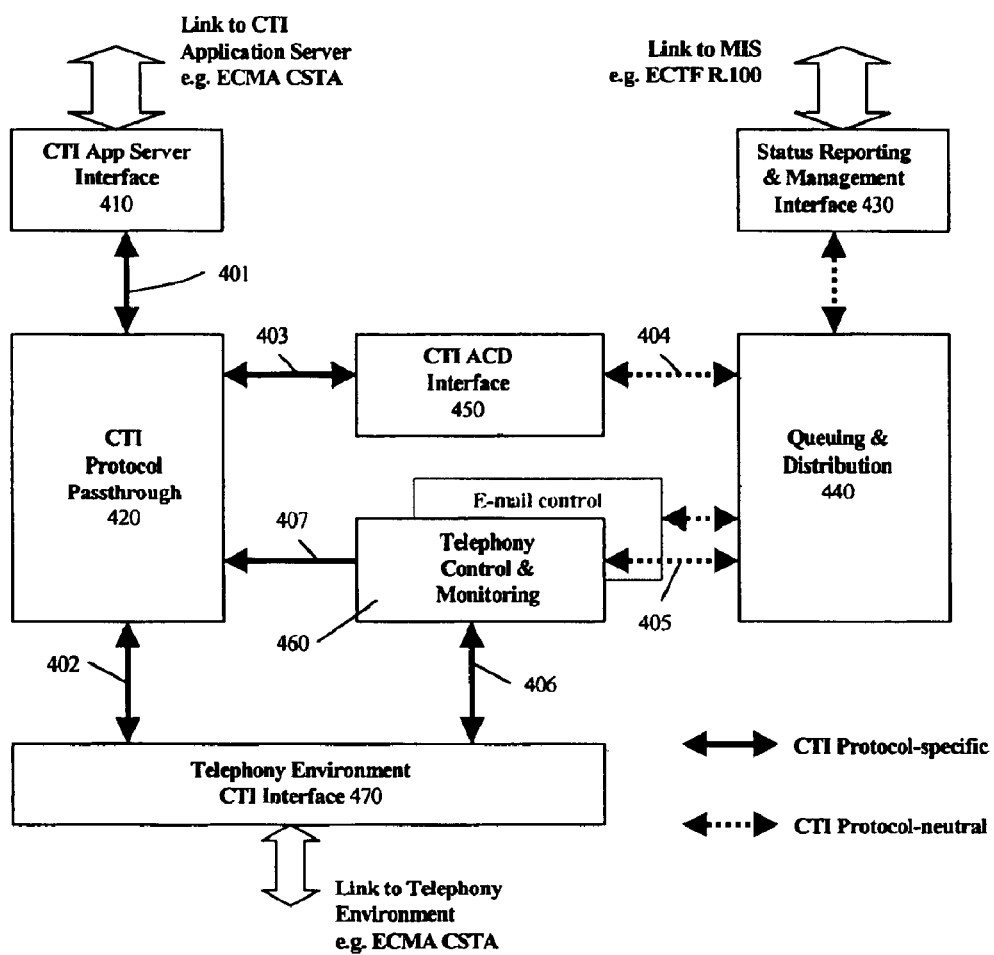
FIG. 4 shows a more detailed diagram of the ACD software depicted in FIG. 3.

A software ACD is disclosed that can work with a packet telephony environment or other non-intelligent switch capable of executing only primitive commands. Additionally, the disclosed software ACD may also interface directly to a business application and provide the business application with a full-function CTI link. Through this link, the business application has the ability to utilize a robust set of CTI commands and functions, including commands that invoke and control both the primitive call control functions of the telephony environment as well as the enhanced ACD functions implemented by the disclosed software ACD. In the invention, a software ACD is interposed between a business application and a switch. The software ACD includes capabilities to translate from one or more complex commands issued by the business application to one or more corresponding primitive commands that the switch or packet telephony environment can decode and execute.

In the embodiment of the present invention shown in FIG. 3, a software ACD 302 includes at least two interfaces 304 and 305. Interface 304 is a full CTI protocol interface which includes a robust set of complex CTI functions. Such an interface may be standardized in accordance with the ECMA or other well known standard so that the business application 301 can issue standardized commands and request functions as if it were connected to the traditional ACD platform 101 shown in FIG. 1. Indeed, the business application 301 may be written and configured just as if it were communicating over link 102 with a traditional ACD platform 101. The functional blocks shown in FIG. 3 may be implemented on the same hardware or different hardware.

In addition to interface 304, a "primitive" interface 305 is also present from software ACD 302. A primitive interface can only issue basic switching commands such as dialing a call, answering a call, placing a call on hold, detecting that a call requires routing, etc. It cannot implement routing or queuing without additional logic implemented externally to the primitive telephony environment. ACD 302 must first convert any complex functions required by a business application to a sequence of primitive commands understood by telephony environment 303. Thus, if a queuing function is desired by the business application, it must be built out of primitive commands generated by ACD 302 and sent to telephony environment 303. To accomplish this queuing function, ACD 302 would typically place selected calls on hold using appropriate primitive commands, maintain information about the state of all "on hold" calls, and complete such calls in an appropriate order again by using appropriate primitive commands. The use of plural such "primitive" commands to implement a "virtual" queuing function permits application 301 to operate using standard protocols designed for connection to a full ACD platform even though a basic, non-intelligent telephony environment 303 is employed.

Interface 304 implements a full CTI link having functionality and commands similar to that of interface 102 in FIG. 1. On the other hand, interface 305 implements commands similar to interface 204 in FIG. 2. The software ACD 302 acts as a liaison, communicating using a fully enabled CTI link with application server 301, and communicating with switch 303 using only primitive switching commands such as "make call", "disconnect call", etc.

Interface 304 commands include such functions as the signaling and management of calls addressed to virtual routing points and queues. Other functions typically associated with a full CTI link include identifying and manipulating the status of agents, where such agents are identified by unique and persistent virtual names instead of (or in addition to) the physical identifiers of the telephone devices they may utilize from time to time. More specifically, the full CTI link would have the capability to designate certain agents as ineligible to receive any calls, or only eligible to receive specific calls. Still another function typically associated with full CTI link is to associate particular ACD agents with physical telephone devices. This permits a call to "Joe" to be routed to whatever particular station Joe is sitting at, rather than to simply a particular telephone number. Additionally, the full CTI link can also treat calls to a particular individual in a specified manner, rather than treating calls to a particular telephone number in that specified manner.

By contrast, primitive interface 305, similar to interface 204 in FIG. 2, can only implement a primitive set of basic switching commands such as connecting, disconnecting, holding and transferring telephone calls based on simple telephone numbers, and detecting that a call requires routing by an external application. While some basic status messages (e.g., failure of a call because the destination was busy) can also be extracted, none of the queuing or other high level functions discussed with respect to the full CTI implementations are available on the primitive link.

Software ACD 302 also includes an optional interface 306 for reporting statistical information regarding the performance of the ACD system to an external computer system. Such a link would include, for example, logs showing the duration of calls and other information regarding billing, quality parameters, and any other administrative information required for maintenance and upkeep of the system. This interface 306 may vary from system to system, and its implementation is itself optional and not critical to implement the present invention.

In operation, application server 301, typically running a business application, issues various complex requests such as the connection of calls based on "virtual" queue or agent identifiers, and call routing and queuing commands. The primary function of ACD 302 is to decompose such complex call connection, routing and queuing functions into a sequence of primitive functions that a switch 303 or other telephone environment is capable of executing.

ACD 302 receives messages from the business application 301. Upon such receipt, if the ACD determines that the business application has issued a function or command which is "primitive" (i.e., directly executable by switch 303) then the request is simply noted and passed to switch 303. While software ACD 302 may utilize the command for purposes such as reporting it out of interface 306, no substantive processing on such primitive requests or commands is necessary.

Alternatively, if the request is for a complex function that is supported by the full CTI link but not a primitive command that switch 303 can execute, then "translation" is required. Translation, as used herein, is not meant to imply that there is a one-for-one relationship between the input and output messages from the ACD. Specifically, a single complex function or command received over link 304 may require a sequence of primitive functions and commands to be issued over interface 305 and executed by switch 303. Additionally, a single complex command from applications server 301 may require an exchange of status messages and various primitive commands between the ACD 302 and the telephony environment 303. A single complex command may invoke an entire subroutine stored in ACD 302.

With respect to interface 305, ACD 302 receives continuous status messages from the switch, but such messages are not immediately passed to the business application 301. Instead, the ACD uses the received primitive messages to maintain its knowledge of the state of the switch. Such primitive messages may be passed up to the business application 301 in their original form if application 301 requires control of primitive switch functions. In addition, copies of those same primitive messages as well as other primitive messages that are not passed to application 301 are utilized by ACD 302 to construct status and other messages which comprise the complex functional messages understood by business application 301. These complex messages are passed up to application server 301.

FIG. 4 depicts a more detailed diagram of the ACD 302 of FIG. 3. The system of FIG. 4 includes components internal to ACD 302 for implementing the functionality described above. It is noted that the labeled functional blocks of FIG. 4 are intended to be logical, not physical. Therefore, any one or more of the functional blocks may be implemented in hardware or software, and the functional blocks may be resident on the same or different processors.

Server interface 410 provides the driver software and other low level communications functions for operating a link to applications server 301 in FIG. 3. Techniques of implementing basic communications drivers software required for server interface 410 are known in the art and available off the shelf. Therefore, they will not be described in detail herein.

Protocol pass-through 420 is a decision-making block that receives commands from and transmits messages to server interface 410. Additionally, protocol pass-through 420 determines if any translation is required before passing a message through to telephony environment 470. If a command received over interface 401 is a primitive command directly executable by a switch (e.g., switch 303 of FIG. 3) and it is also a command that queuing and distribution function 440 does not need to be aware of, then the command is simply passed through to the telephony environment 470 through interface 402 without being altered. If the command is a request for status messages related to primitive switch devices, it is passed to function 460 through interface 407 to be noted and subsequently passed to the telephony environment by function 460. Otherwise, the message must be a request for a complex ACD function and protocol pass-through 420 will send the command out interface 403 for further processing.

Queuing and distribution function 440 implements complex ACD functions such as virtual agent names and call queuing. Function 440 receives complex call control requests through interface 404, decomposes those requests into multiple primitive call control instructions, sends those primitive instructions through interface 405, receives responses through interface 405, and sends appropriate responses to the original complex requests through interface 404.

ACD interface 450 translates commands and messages from and to server interface 410 to a "protocol neutral" format so that they can be easily processed by function 440. The messages on interface 404 maintain the same information as those in cross-interface 403, however, the specific encoding used for any particular CTI standard interface (e.g., ECMA) is removed.

In a similar fashion, the telephony control and monitoring function 460 operates to strip specific encodings from messages received across interfaces 406 and 407 so that the content can be communicated to function 440 through interface 405, and to reapply similar encodings to content received from interface 405 and sent to other functions. Function 460 transmits commands to, and receives messages from, the telephony environment as shown via interface 406. Function 460 receives primitive device monitoring requests through interface 407 and responds with sequences of primitive status messages through that same interface.

Interfaces 430 and 470 also contain basic driver software for communicating with particular physical devices as is known in the art.

In operation, consider an application desirous of implementing a typical ACD function such as multiple queues with call distribution using a basic switch or other telephony environment 303 of FIG. 3 in conjunction with the ACD of FIG. 4. Commands are sent down over a full-function CTI interface to server interface 410 and are forwarded to protocol pass-through 420. Protocol pass-through 420 examines the particular command being passed down to determine if such command is a "primitive command" capable of being executed directly by the switch 303. If the command is executable directly by the switch 303, it is passed through telephony environment interface 470 and conveyed to the switch for execution.

If a command received at protocol pass-through 420 is a complex command that requires, for example, call queuing, then the simplistic non-intelligent switch 303 will not be able to execute such a command. Instead, the queuing function will have to be built from a series of commands to the switch which place various calls on hold and instruct the switch when to process those calls by connecting them to appropriate telephony devices for conversation with agents.

In such a case, the complex command is sent through ACD interface 450 to queuing and distribution function 440. The interface 404 contains the same information as the original complex command received over 403 however, any protocol specific formatting and other information is removed. Queuing and distribution software 440 includes data storage used to maintain the real-time status of ACD and telephony environment components, as well as sequences of stored commands and sub-routines to be implemented in response to specific complex commands. The sub-routines cause appropriate primitive commands to be sent to telephony environment interface 470 for execution by the switch.

Note that the primitive commands received at telephony environment interface 470 over interfaces 402 and 406 are mapped to physical devices and resources. Thus, these commands and messages are items such as "make call to specified telephone number", "call has been disconnected from specified telephone device", etc. However, complex commands issued by the applications server may often contain references to virtual devices such as a user name or a queue. The queuing and distribution software 440 is responsible for generating the primitive commands necessary to cause the switch to simulate the native call queuing of a full-featured ACD, and for translating users name into the physical devices at which the users are logged on.

By utilizing the ACD interposed between an application server 301 and a telephony environment 303, the applications server can utilize a standard set of full CTI commands, while at the same time a basic non-intelligent switch or newer telephony environment can be utilized. Furthermore, with the arrangement taught by this invention, the applications server can simultaneously issue CTI commands pertaining to both primitive- and complex-mode functions and addresses, and the requests are routed and processed properly.

An example of an application issuing a primitive command which is directly passed through by protocol pass-through 420 would be a monitor command, wherein an application desires to monitor when a specific telephone is ringing. A typical "start monitor" command would be issued from the application to ACD 302, specifying the telephone number of the telephone desired to be monitored. Such a command is passed in standardized form with an attached telephone number through ACD 302. Protocol pass-through 420 would simply pass the command on to telephony environment 470, for conveyance to the switch 303. The switch 303 generates a "call ringing" message upon arrival of a call to the specified telephone number. The call ringing message is then passed back up without modification through functions 470, 460, 420 and 410 to the application server 301. In such a relatively simple scenario, the ACD does not need to translate or breakdown the complex command into primitive switch commands because the original command relates solely to primitive devices and functions therefore directly executable by the switch 303.

The more complex case is shown in flowchart form in FIG. 5. The example of FIG. 5 implements an application request to monitor calls being received by a particular agent, rather than by a particular telephone number.

Before describing the example of FIG. 5 in more detail, we note that the ACD 302 may actually operate in parallel both on complex commands and messages sent to and from the application server 301, as well as on primitive commands and messages sent to and from the same application server that simply get passed through. Accordingly, the application need not distinguish between the two types of request, as this distinction is handled automatically by ACD 302 as disclosed herein.

Turning to FIG. 5, the flow chart is entered at start 501. The remaining operational blocks comprise functions required to implement the basic command of monitoring a particular agent's telephone. In the typical example described, the agent is responsible for receiving calls in sequence from a queue. It will be apparent from context which steps operate within the switch 301, ACD 302, or applications server 303 respectively.

At block 502, the queue is configured by an external administrator. Using standard techniques available in the prior art, an administrator would issue commands to the software ACD to configure a specified queue to be used for servicing incoming telephone calls. At block 503, a route point within the telephony environment is chosen and configured, which comprises a virtual telephone number within the telephony environment that does not correspond to a physical telephone. Calls to the telephone number of the route point will cause the telephony environment to generate a signal to the ACD 302 that will trigger subsequent call queuing actions within the ACD 302.

At block 504, a specified agent logs into the ACD 302, identifying during such log-in process at block 505 a telephone device at which he is located, and furthermore indicating an ability to accept calls from the previously configured queue. After the agent logs in, ACD 302 at block 506 sends a "start monitor" command to switch 303, specifying the agent's physical telephone device as determined in block 505.

During operation, at block 507, a party places a call to the queue's telephone number and the call is received at the telephone environment route point defined at block 503. As a result of the "start monitor" command issued by ACD 302 at block 506, a call arrival event is generated at block 508 by switch 303 and sent to the ACD 302 indicating that a call has arrived at the particular routing point. At block 509, ACD 302 issues a primitive call routing command informing switch 303 of a physical telephone device to which that particular call should be sent. (If no physical telephone device is available for this call, step 509 is delayed until such a device becomes available.) At block 510, the telephony environments ends the call to that particular telephone device and a primitive message indicating that the device is ringing is sent by the telephony environment to ACD 302. Upon receipt of such message, at block 511, ACD 302 maps the ringing telephone to the particular agent sitting at that telephone through a table look-up. At block 512, ACD 302 sends a complex message up to applications server 301 indicating that the particular agent's telephone is ringing.

While the interface 304 between applications server 301 and ACD 302 can request that a particular agent be monitored, and can provide notification when that agent's telephone is ringing, the switch 303 does not know about particular agents. Instead, interface 305 only exchanges information and commands related to when a particular telephone is ringing. The translation between a particular telephone understood by switch 303, and a particular agent understood at applications server 301, is conducted via ACD 302. Thus, the application is insulated from the primitive commands of the switch.

The foregoing describes the invention, however, various modifications and additions will be apparent to those of skill in the art. The examples given herein are not for purposes of limitation.

What is claimed is:

1. Apparatus comprising:
   a switch for switching calls in response to primitive commands, and for transmitting primitive status messages in response to switching said calls;
   an automatic call distributor (ACD), for transmitting said primitive commands to said switch, and for receiving said primitive status messages, said ACD also being capable of translating said primitive commands and said primitive status messages to complex commands and status messages and interfacing with an application computer via said complex commands and status messages.

2. Apparatus of claim 1 wherein said applications computer comprises software for transmitting said complex commands to said ACD and receiving said complex status messages from said ACD.

3. Apparatus of claim 2 wherein said ACD receives said complex commands, translates said complex commands to said primitive commands, and transmits said primitive commands to said switch.

4. Apparatus of claim 3 wherein said primitive commands are a subset of said complex commands.

5. Apparatus of claim 4 wherein said ACD comprises a processor for examining complex commands received from said application, determining whether such complex commands require translation to primitive commands, and transmitting said complex commands, whether or not translated, to said switch.

6. Apparatus of claim 5 wherein said ACD includes a reporting interface.

7. Apparatus of claim 6 wherein said ACD includes a control and monitoring interface.

8. A method comprising sending a command from a software application to an automatic call distributor (ACD), examining said command to determine if said command is within a primitive command language upon which a predetermined telephony environment can operate, and if so, sending said command to said switch, and if not, translating said command into one or more commands upon which said telephony environment can operate and then sending said translated commands to said telephony environment.

9. The method of claim 8 wherein said ACD also is arranged to queue calls.

10. The method of claim 8 further including switching calls through a packet telephony environment.

11. The method of claim 10 including switching calls through a gatekeeper.

12. The method of claim 10 further including switching calls through a pass through server.

13. Apparatus for implementing an automatic call distributor (ACD) including at least a first and second interface, said first interface implementing a primitive set of switching commands and being connected to a switch for causing the switch to perform specified operations, said second interface being connected to an external applications computer and being capable of accepting and processing complex commands, translating said complex commands to one or more switching commands, and sending said switching commands to said switch.

14. Apparatus of claim 13 including a CTI-ACD Interface function for forwarding messages received from an application server after removing information specific to a protocol implemented between said ACD and said application server.

15. Apparatus of claim 14 further comprising a processor for implementing queuing and distribution software.

16. An article or set of articles comprising a computer readable medium having instructions stored thereon which, when executed, causes receiving a command at a software automatic call distributor (ACD) from an applications computer, examining the command to determine if it is directly executable by an attached telephony environment, and if so, transmitting said command to said attached telephony environment, and if not, translating said command into one or more primitive commands and transmitting said primitive commands to said telephony environment.

17. The article of claim 16 wherein said instructions, when executed, further cause receiving messages from said telephony environment in response to activity in said telephony environment, determining if said message needs to be translated, if not, forwarding said message to said applications computer, and otherwise, translating said message into one or more messages recognizable by said applications computer, and forwarding said translated commands to said applications computer.

18. The article of claim 17 wherein at least one of said commands causes a conversion to or from an identifier associated with an individual to a phone number associated with a telephone device being used by said individual.

19. The article of claim 18 wherein at least one of said commands causes said ACD to implement a queue.

20. The article of claim 19 wherein said commands implement routing.

* * * * *